United States Patent [19]
Hasegawa

[11] Patent Number: 6,075,552
[45] Date of Patent: Jun. 13, 2000

[54] MONITORING SYSTEM OF MULTIMEDIA COMMUNICATION TERMINAL

[75] Inventor: Satoshi Hasegawa, Tokyo, Japan

[73] Assignee: NEC Corporation, Tokyo, Japan

[21] Appl. No.: 08/872,905

[22] Filed: Jun. 11, 1997

[30] Foreign Application Priority Data

Jun. 12, 1996 [JP] Japan ..... 8-150516
Jun. 21, 1996 [JP] Japan ..... 8-181164

[51] Int. Cl.[7] ..... H04N 7/00
[52] U.S. Cl. ..... 348/12; 348/192; 348/845.1
[58] Field of Search ..... 348/10, 11, 7, 348/6, 12, 13, 1, 3, 390, 180, 192, 845.1; 358/139, 84; 371/32, 37.02, 31; 714/50, 51, 52, 748, 776, 812, 799; H04N 7/16, 7/13, 7/137

[56] References Cited

U.S. PATENT DOCUMENTS

| | | | |
|---|---|---|---|
| 4,205,347 | 5/1980 | Minoura et al. | 348/731 |
| 4,737,993 | 4/1988 | DeVilBiss | 348/10 |
| 5,559,999 | 9/1996 | Maturi et al. | |

FOREIGN PATENT DOCUMENTS

| | | | |
|---|---|---|---|
| 59-178885 | 10/1984 | Japan | 358/139 |
| 60-51141 | 11/1985 | Japan . | |
| 63-45698 | 2/1988 | Japan . | |
| 4-12772 | 1/1992 | Japan . | |
| 4-284085 | 10/1992 | Japan . | |
| 4-324784 | 11/1992 | Japan . | |
| 5-122695 | 5/1993 | Japan | H04N 7/16 |
| 5-168012 | 7/1993 | Japan . | |
| 7-177493 | 7/1995 | Japan . | |
| 7-250314 | 9/1995 | Japan . | |
| 8-125993 | 5/1996 | Japan . | |

*Primary Examiner*—David E. Harvey
*Attorney, Agent, or Firm*—Ostrolenk, Faber, Gerb & Soffen, LLP

[57] ABSTRACT

In order to provide a monitoring system of a multimedia communication terminal which can detect abnormal reproduction of multimedia data, reliably with a simple configuration together with a sufficient consideration of the user's interface, surely discriminating the scheduled interruption of the multimedia data delivery, the monitoring system of the invention comprises a decode counter (49), a count value of said decode counter being incremented each time when video data of a picture frame is decoded from multimedia data delivered through the transmission line (23) by a video decoder (48), and control means (41) for discriminating whether the multimedia data are supplied or not by detecting beginning and ending of reproduction of the multimedia data, and detecting occurrence of an abnormal state in the multimedia communication terminal (22) by checking alteration of said count value.

9 Claims, 10 Drawing Sheets

MONITORING SYSTEM OF MULTIMEDIA COMMUNICATION TERMINAL

BACKGROUND OF THE INVENTION

The present invention relates to a multimedia communication terminal for reproducing video data delivered through a bi-directional transmission cable, and more particularly to a monitoring system for monitoring status of the multimedia communication terminal and detecting an abnormal state occurring there in reproducing the video data.

Video data service by way of a bi-directional transmission cable such as CATV has become popular according to diversification of personal or business demands on video information. Especially, technical developments on an interactive television service called VOD (Video On Demand) are active.

FIG. 11 is a block diagram illustrating a CATV system disclosed in a Japanese patent application laid open as a Provisional Publication No. 324784/'92 for realizing the VOD service with simple equipment.

Referring to FIG. 11, there is connected a center system so-called a head end system 11 at an end of a transmission line 12, and each of the other ends of the transmission line 12 is connected to a STB (Set Top Box) 13 provided at each of a plurality of subscribers of the CATV system. The head end system 11, having recording media or a video recorder, supplies multimedia data and takes charge of the supply control. The STB 13 functions as a multimedia communication terminal and is connected to a video display 14 having an interface with the STB. In the CATV system of FIG. 11, there is also provided a special channel selector SCS 15, which is controlled only from the head end system 11 to be tuned to one of transmission channels to be connected to a special program channel of a program selector of the STB 13.

In the CATV system, when a subscriber designates a specified program so as to be delivered at a specified time, the supplier at the head end system 11 remote-controls the tuning circuit of the SCS 15 to be tuned to a transmission channel through which the specified program is delivered, so that the subscriber can enjoy the specified program by operating the program selector of the STB 13 to select the special program channel connected to output of the SCS 15.

This is an example of the VOD system.

There is also proposed and being developed a CATV system called an N-VOD (Near Video On Demand). In an N-VOD system, subscribers previously register programs and time zones they desire to be reserved and the service provider delivers multimedia data of a program at a time zone from the head end system through the transmission line to subscribers who reserved the program at the time zone.

There is also proposed another N-VOD system wherein the head end system delivers multimedia data of the same program through a plurality of transmission channels, with a certain time difference between each other of the plurality of transmission channels, for enabling a subscriber, who intends to enjoy the program, to select one of the plurality of the transmission channels where data of the intended program is to be delivered in his adequate time zone.

In these N-VOD systems, the multimedia data are supplied in a certain time zone and the subscriber should wait for beginning of the desired program when the subscriber turns on the multimedia communication terminal before the beginning, watching his display in vain.

For the purpose, there is proposed an N-VOD system in a Japanese patent application laid open as a Provisional Publication No. 250314/'95, wherein a special sub-channel is selected when a subscriber turns on the multimedia terminal and designated a main channel where his desired program is soon beginning. In the special sub-channel, several short programs are served and at the timing when the desired program begins in the main channel, the multimedia terminal is controlled to be turned over to the main channel, enabling the subscriber to enjoy the N-VOD system with little incongruity.

In these services, namely, the VOD services or the N-VOD services, the head end system takes charge of a supply control and, in the sense, the service provider is responsible for a good service delivered to each of the subscribers, and there may be always a chance wherein an abnormal state occurs in the multimedia communication terminal by an unexpected obstacle, even when all other equipment are working normally.

Accordingly, an effective method has been needed for detecting the abnormal state in the multimedia communication terminal and reporting it to the head end system.

In a Japanese patent application laid open as a Provisional Publication No. 45698/'88, there is proposed a method for detecting an abnormal state from picture data of a monitor ITV, wherein brightness value of pixel data A/D-converted of a moving picture frame is compared with that of a picture frame taken previously by 0.5 to 1 second. When the brightness difference between two picture frames remains within a threshold value for a certain period, it is decided that an abnormal state has occurred in the monitoring object, in a production robot, for example, which should work without cease.

In another Japanese patent application laid open as a Provisional Publication No. 51141/'85, there is proposed a method for detecting runaway of software, wherein is implemented a runaway watch program that periodically interrupts the main program at a low priority of interruption. When the runaway watch program ends normally, a performance confirmation pulse is generated to be counted by a pulse counter. Another counter counts the number of interruptions programmed to occur in a certain interval. Thus, a software runaway is detected, in the proposed method, by comparing the number of the performance confirmation pulses with the number of interruptions, as no performance confirmation pulse is generated when the runaway watch program does not end normally.

However, these prior methods for detecting abnormal states are a little too complicated to be applied widely for detecting abnormal state of the multimedia communication terminal. Moreover, there may be cases where picture brightness variance remains within the threshold value even when the multimedia communication terminal is operating normally, or cases, on the contrary, where some obstacle is seen even when software in the multimedia communication terminal is operating normally.

Furthermore, in the N-VOD systems such as previously described, there may be scheduled interruptions of multimedia data supply, where no picture is reproduced despite no abnormal state of the multimedia communication terminals.

SUMMARY OF THE INVENTION

Therefore, a primary object of this invention is to provide a monitoring system of a multimedia communication terminal which can detect abnormal reproduction of multimedia data, reliably with a simple configuration together with a sufficient consideration of the user's interface as well as of the head end's needs.

Another object of the invention is to provide a monitoring system which can discriminate the scheduled interruption of the multimedia data delivery surely from the abnormal reproduction thereof.

In order to achieve these objects, a monitoring system of a multimedia communication terminal according to an embodiment of the invention comprises;

a decode counter, a count value of said decode counter being incremented each time when video data of a picture frame is decoded from multimedia data delivered through the transmission line by a video decoder provided in the multimedia communication terminal;

control means for detecting occurrence of an abnormal state in the multimedia communication terminal by checking alteration of the count value;

a video data processing unit controlled by the control means to generate display data for informing a user of the abnormal state when the abnormal state is detected; and a communication circuit controlled by the control means to send an abnormal message to the head end system requesting suspension of delivery of the multimedia data to the multimedia communication terminal when the abnormal state is detected, and to send a reopening request to the head end system requesting reopening of delivery of the multimedia data to the multimedia communication terminal when the abnormal state is confirmed to be eliminated.

In another embodiment of the invention, the control means also discriminates whether the multimedia data are supplied or not by detecting beginning and ending of reproduction of the multimedia data;

the communication circuit is controlled by the control means to send an abnormal message informing the head end system of the abnormal state when the multimedia data is supplied and the abnormal state is detected; and the video data processing unit is controlled by the control means to generate the display data for informing a user of the abnormal state when the multimedia data is supplied and the abnormal state is detected.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
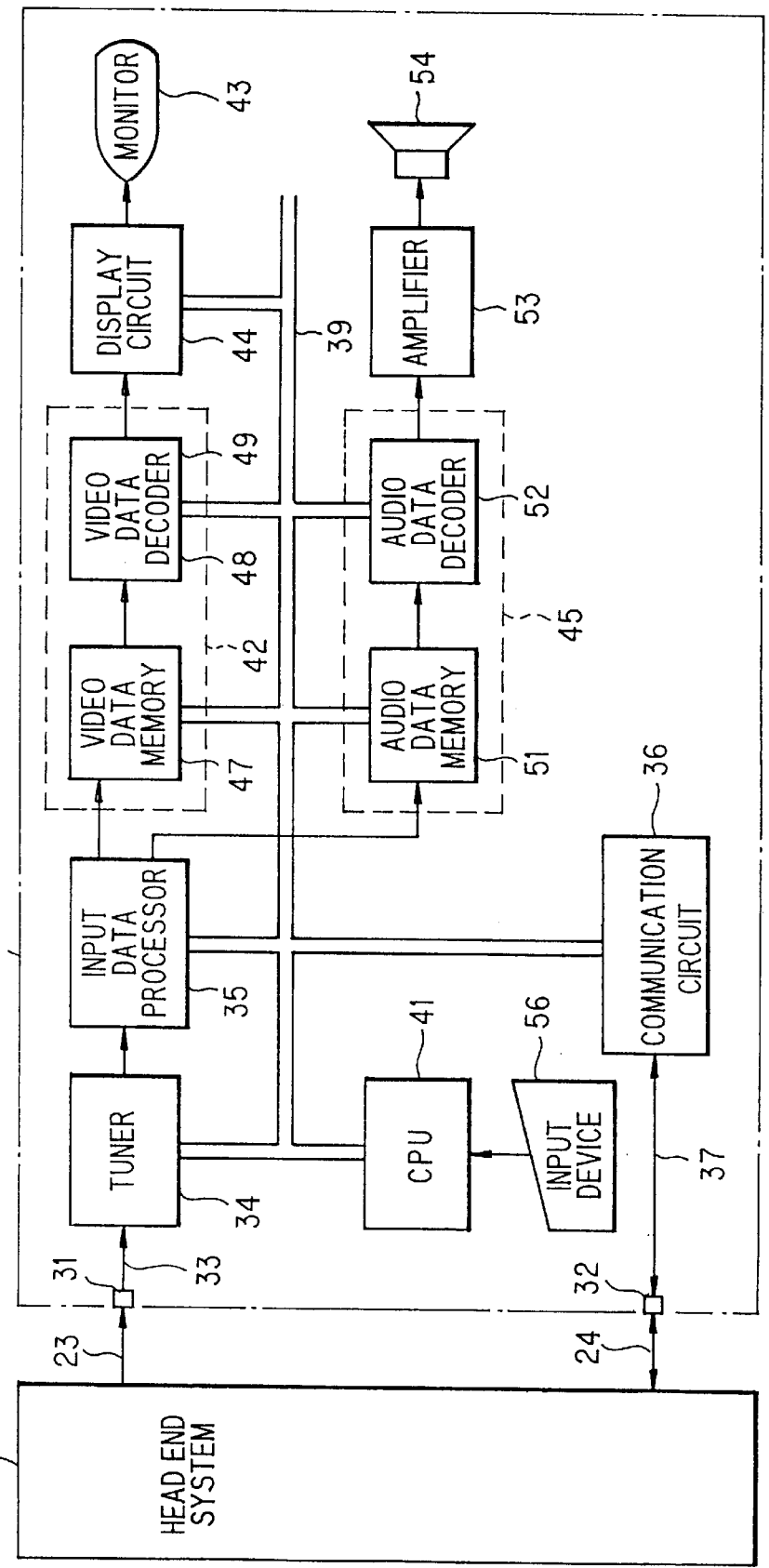
FIG. 1 is a block diagram illustrating a multimedia communication terminal connected with a head end system according to an embodiment of the invention.

FIG. 1 is a block diagram illustrating a multimedia communication terminal 22 connected with a head end system 21 through a transmission line 23 for delivering multimedia data and a control signal line 24 for exchanging control signals. The head end system 21 is equipped with recording media or a video recorder, supplies multimedia data and takes charge of the supply control as described in connection with the head end system 11 of FIG. 11.

Referring to FIG. 1, the multimedia communication terminal 22 comprises;

a tuner 34 for selecting a desired channel from multimedia data 33 supplied through a data input terminal 31 connected to the transmission line 23, an input data processor 35 for extracting video data and audio data from data of a channel selected by the tuner 34, a video data processing unit 42 having a video data memory 47 for buffering the video data extracted by the input data processor 35 and a video data decoder 48 for decoding the video data buffered in the video data memory 47, a display circuit 44 for generating display signals to be displayed on a monitor 43 according to the video data decoded by the video data processing unit 42, a audio data processing unit 45 having an audio data memory 51 for buffering the audio data extracted by the input data processor 35 and an audio data decoder 52 for decoding the audio data buffered in the audio data memory 51, an amplifier 53 for amplifying the audio data decoded by the audio data processing unit 45 to be output through a speaker 54, a communication circuit 36 for exchanging control signals 37 through a control signal I/O terminal 32 connected to the control signal line 24, a CPU 41 for controlling the tuner 34, the input data processor 35, the communication circuit 36, the video data memory 47, the video data decoder 48, the display circuit 44, the audio data memory 51, the audio data decoder 52, and so on, by way of bus lines 39, and an input device 56 for inputting user's indication to the CPU 41.

Figure 11:
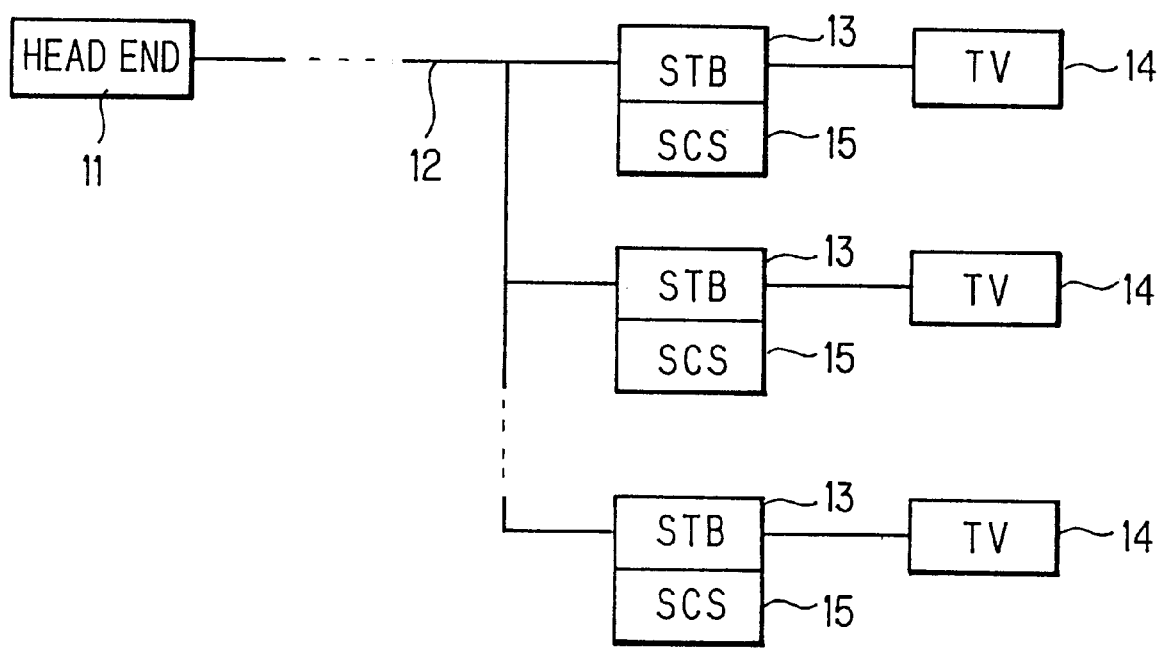
FIG. 11 is a block diagram illustrating a prior CATV system.

To the bus lines 39, there are also connected a ROM (Read Only Memory), a RAM (Random Access Memory), etc., (not shown in the drawings) to be used by the CPU 41. Furthermore, in FIG. 1, there is illustrated a multimedia communication terminal 22 having the display circuit 44, the monitor 43, the amplifier 53 and the speaker 54 in its unit. However, the multimedia terminal may be composed of a STB and a video monitor, as illustrated in FIG. 11.

In the embodiment of FIG. 1, a decode counter 49 is also provided in the video data decoder 48.

The decode counter 49 counts a number of pictures decoded by the video data decoder 48, that is, the count value of the decode counter 49 is incremented every time when decoding data of a picture frame is accomplished in the video decoder 48.

By reading out the count value of the decode counter 49 periodically, the CPU 41 of the embodiment detects the abnormal state of the multimedia communication terminal 22.

Figure 2:
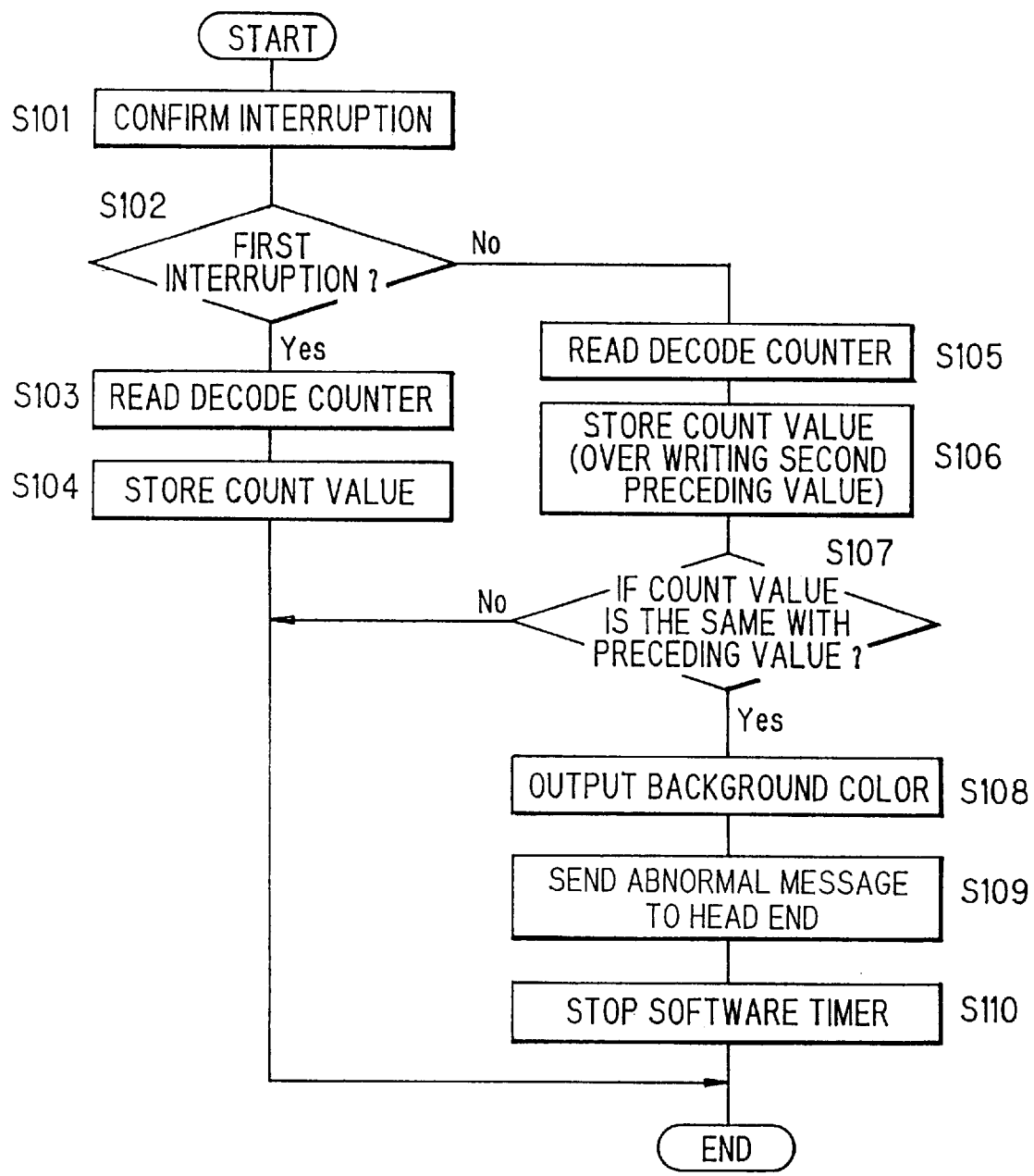
FIG. 2 is a flowchart illustrating the abnormal state detection routine performed by the CPU 41 of FIG. 1.

FIG. 2 is a flowchart illustrating the abnormal state detection routine performed by the CPU 41.

The abnormal state detection routine starts triggered by a periodical interruption from a software timer, counting a clock signal of the CPU 41, for example.

The interval of the periodical interruption is to be set longer than a processing time needed for decoding data of at least one picture frame. In the embodiment, the interval is set also longer than a time needed from when a reopening request of multimedia data transmission is sent out from the multimedia communication terminal 22 until when a picture is reproduced from the multimedia data delivered from the head end system 21 after the reopening of multimedia data transmission. The reason will be described afterwards.

When the multimedia communication terminal 22 begins reproduction of multimedia data, the software timer begins to count up and the CPU 41 is interrupted and changed over to the abnormal state detection routine. The CPU 41 confirms the interruption (at step S101) and checks if the interruption is the first interruption after beginning of the reproduction (at step S102), referring to an interruption register, for example, provided in the RAM, which is cleared at every beginning of the picture reproduction and incremented at every interruption.

When the interruption is the first interruption, the CPU 41 reads out the count value of the decode counter 49 (at step S103) and stores the count value in an area of the RAM (at step S104), ending the abnormal state detection routine for waiting a second interruption.

When the interruption is not found to be the first interruption (at step S102), the CPU 41 reads out the count value of the decode counter 49 (at step S105) and stores the count value overwriting (at step 106) at the area where the count value read out at the interruption before the preceding interruption is stored. (Therefore, that area is written for the first when the concerning interruption is the second interruption after a beginning of reproduction.) Then, the concerned count value is compared (at step S107) with that previously stored in the other area of the RAM read out from the decode counter 49 at the interruption just preceding the concerning interruption.

If the concerned count value differs from the preceding count value, it is confirmed that data of at least one picture are decoded normally in the interval and the abnormal state detection routine ends.

In case the concerned count value is found to be the same as the preceding count value, the CPU 41 decides that some abnormal state has occured in the multimedia communication terminal 22, controlling the video decoder 48 (at step S108) to output a background color to mask the displayed picture therewith. Then, the CPU 41 controls the communication circuit 36 (at step S109) to send a message to the head end system 21, the upper system of the multimedia communication terminal 22, informing it of an abnormal state occurrence, which is transmitted in the control signals 37 to the head end system 21 by way of the control signal line 24, and the abnormal state detection routine ends, the software timer being stopped (at step S110) for suspending following interruptions.

Figure 3:
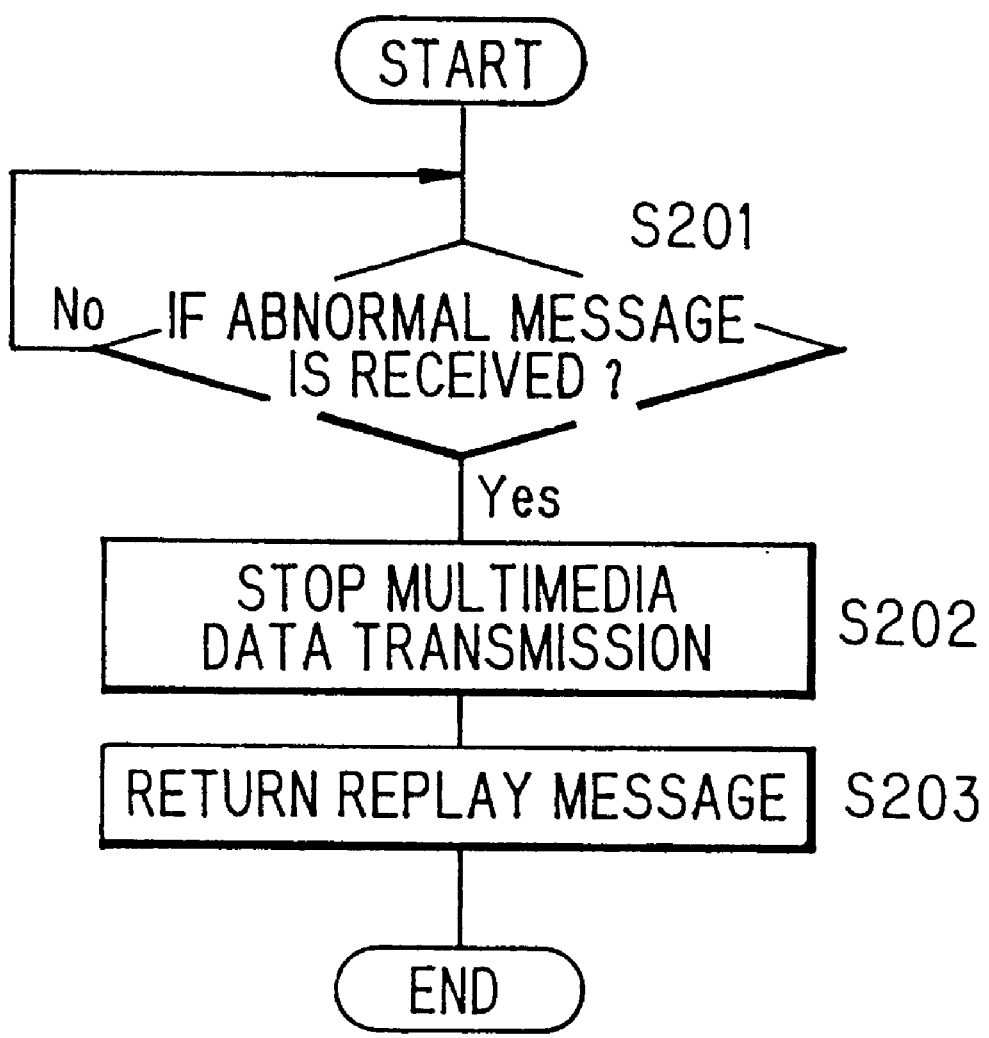
FIG. 3 is a flowchart illustrating operation in the head end system 21 of FIG. 1 receiving a massage informing the head end system of the abnormal state occurence.

FIG. 3 is a flowchart illustrating operation in the head end system 21 receiving the message informing it of the abnormal state occurence in the multimedia communication terminal 22.

When a control unit (not shown in the drawings) in the head end system 21 receives a message (at step S201) informing the head end system 21 of an abnormal state occurence in a multimedia communication terminal, the multimedia communication terminal 22, for example, the control unit controls the head end system 21 to stop to transmit the multimedia data 33 to the multimedia communication terminal 22 (at step S202) and returns a reply message thereto (at step S203) through the control signal line 24, informing it of the suspension of the data transmission.

Figure 4:
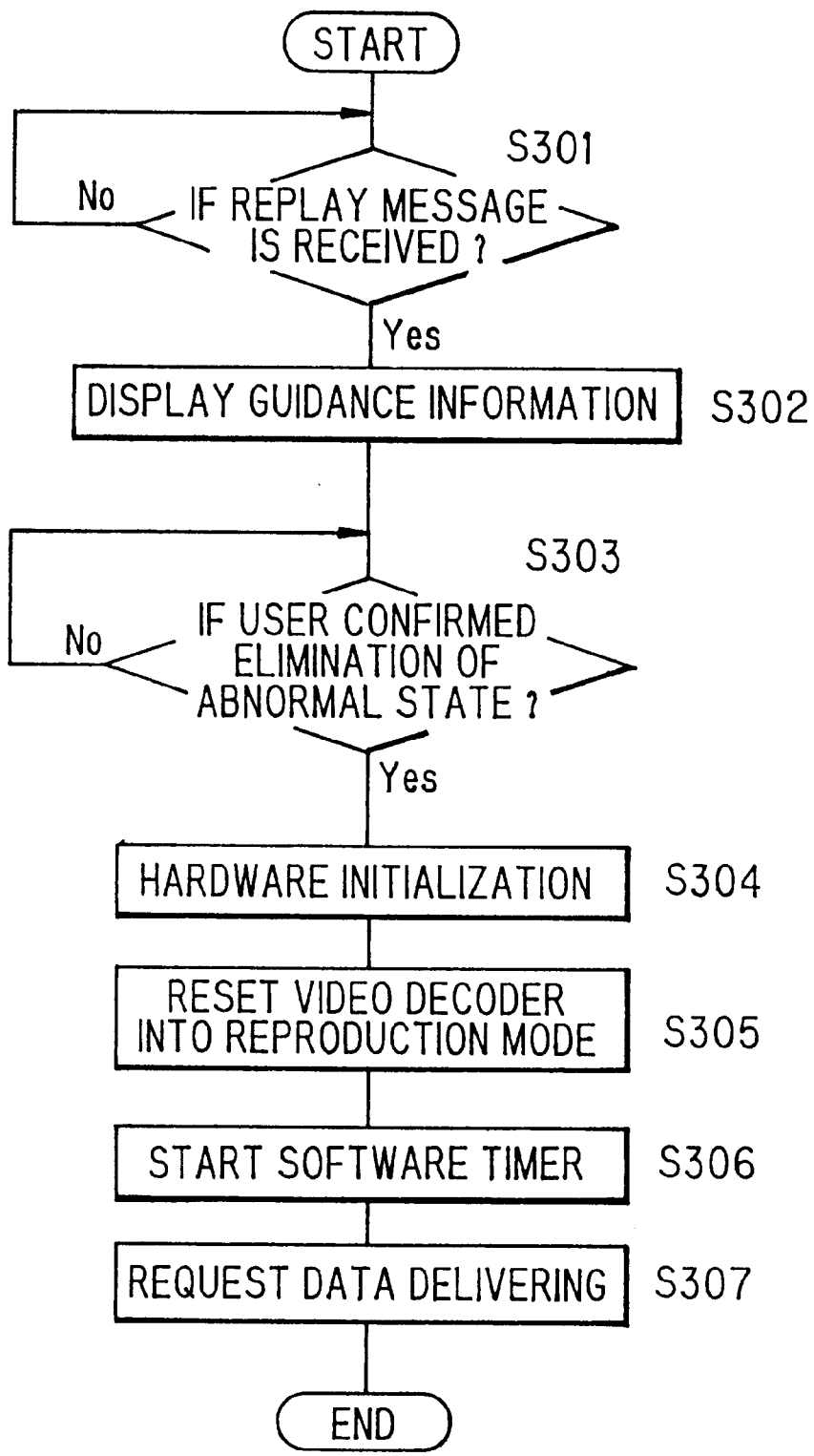
FIG. 4 is a flowchart illustrating operation of the multimedia terminal 22 receiving the reply message from the head end system 21.

FIG. 4 is a flowchart illustrating operation of the multimedia terminal 22 receiving the reply message from the head end system 21.

The CPU 41 waits for the reply message (at step S301) after sending out (at step S109 of FIG. 2) the message informing the head end system 21 of the abnormal state occurence, and, when it is received, controls the video data processing unit 42 to display information (at step S302) saying to the user that the data delivering is suspended by the head end system because of an abnormal state occurrence in the multimedia communication terminal 22.

The user can confirm the actual state of the multimedia communication terminal 22 from the displayed information, wherein may be included an indication to the user of some probable causes to be checked. According to the indication to check the cable connection, the user can reset the transmission line 23 to the data input terminal 31 when the connection is loose or off, for example.

In the embodiment, the CPU 41 waits (at step S303) a user's key input confirming elimination of the abnormal state.

When the elimination of the abnormal state is confirmed with the user's key input, the CPU 41 initializes the input data processor 35 (at step S304), resets the video decoder 48 into the reproduction mode (at step S305), restarts the software timer (at step S306) and requests to the head end to reopen the multimedia data transmission (at step S307).

In the embodiment, the reopening request of multimedia data transmission is sent (at step S307) after starting the software timer (at step S306). This is the reason the interruption interval of the software timer is set, as beforehand described, longer than a time needed from when the reopening request is sent out until when a first picture is reproduced from the multimedia data delivered from the head end system 21.

Figure 5:
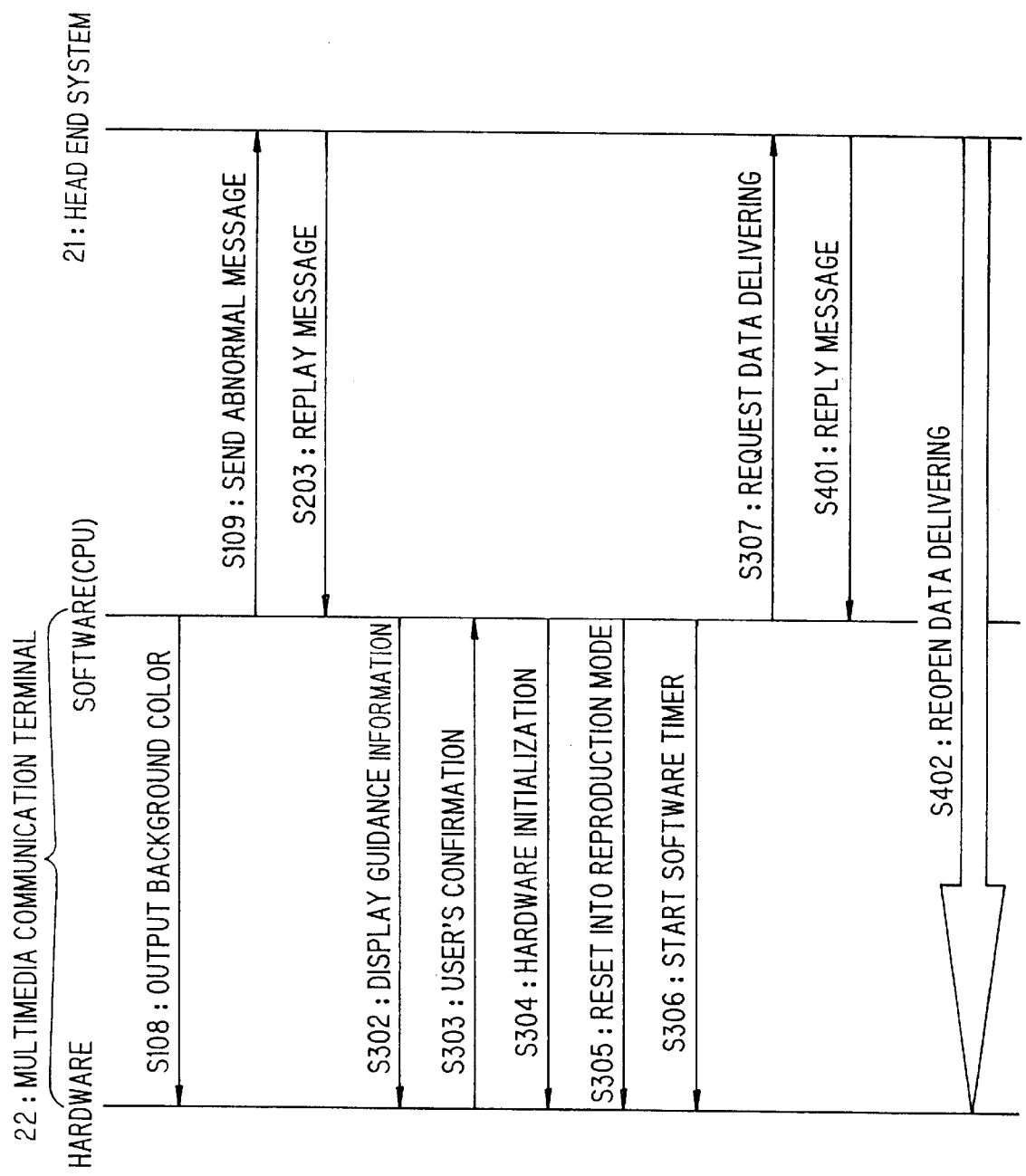
FIG. 5 is a timing chart illustrating a sequence of controls performed by the CPU 41.

FIG. 5 is a timing chart illustrating a sequence of controls performed by the CPU 41, namely the software of the multimedia communication terminal 22, in connection with the hardware thereof and the head end system 21. Control steps described referring to FIGS. 2 to 4 are represented with the same step numbers and duplicated description is omitted. Replying to the reopening request sent at step 307 from the multimedia communication terminal 22, a confirmation reply is returned (at step S401) from the head end system 21 and the multimedia data supply is reopened (at step S402).

Thus, in the embodiment, an abnormal state of the multimedia communication terminal 22 is detected and reported to the head end system individually, and the data supply is controlled accordingly.

Heretofore, the embodiment is described where the multimedia data are reproduced at a normal speed in the multimedia communication terminal 22, but it is easily understood that the embodiment can be applied in the same way when a special reproduction, a slow speed reproduction, for example, of the multimedia data are performed there.

Figure 6:
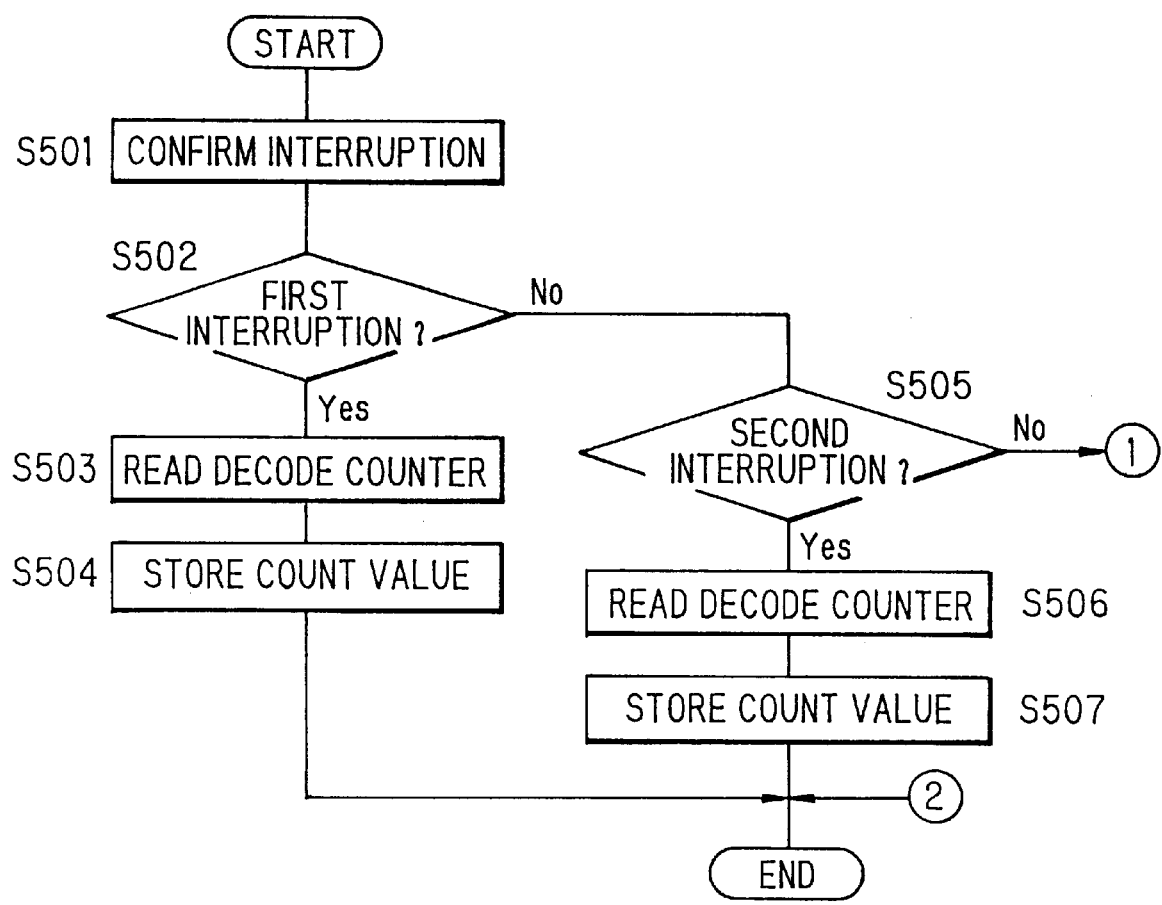
FIG. 6 is a flowchart illustrating former part of the abnormal state detection routine according to another embodiment of the invention.
Figure 7:
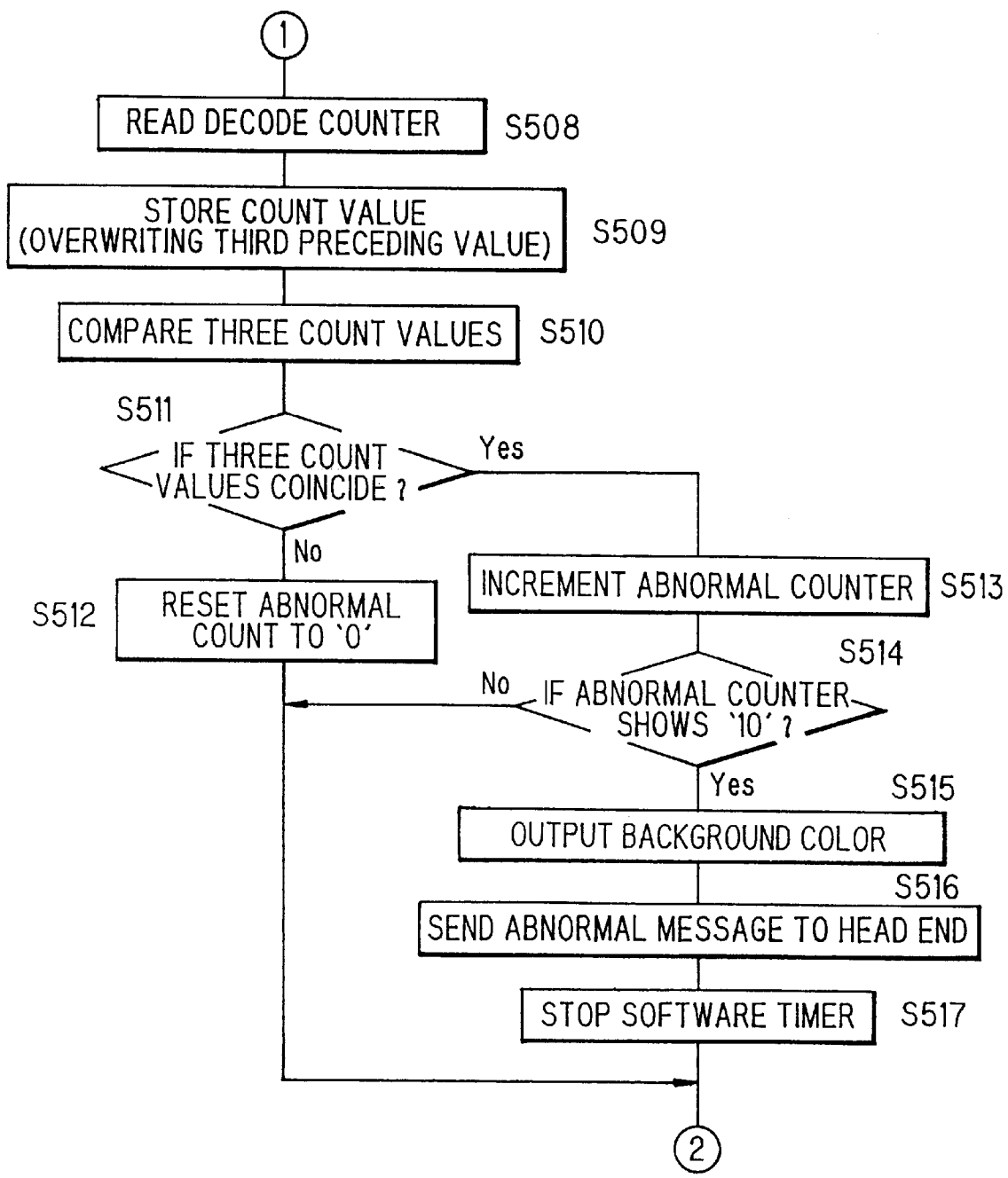
FIG. 7 is a flowchart illustrating the latter part of the abnormal state detection routine of FIG. 6.

The abnormal state detection routine illustrated in FIG. 2 may be modified as shown in FIGS. 6 and 7, wherein the detection period can be set independent of the interruption interval of the software timer.

FIG. 6 is a flowchart illustrating former part of the abnormal state detection routine according to another embodiment of the invention, which is performed in the CPU 41 triggered by the interruption of the software timer in the same way as the embodiment of FIG. 2.

When the multimedia communication terminal 22 begins reproduction of multimedia data, the software timer begins to count up and the CPU 41 is interrupted and changed over to the abnormal state detection routine periodically. The CPU 41 confirms the interruption (at step S501) and checks if the interruption is the first interruption after beginning of the reproduction (at step S502), referring to an interruption register, for example, provided in the RAM, which is cleared at every beginning of the picture reproduction and incremented at every interruption.

When the interruption is the first interruption, the CPU 41 reads out the count value of the decode counter 49 (at step S503) and stores the count value in an area of the RAM (at step S504), ending the abnormal state detection routine and waiting for a second interruption.

When the interruption is not found to be the first interruption (at step S502), the CPU 41 checks if the concerned interruption is the second interruption (at step S505), in this embodiment. When it is the case, the abnormal state detection routine ends and waits for the third interruption, storing the count value read out of the decode counter 49 in another area of the RAM (at step S507).

FIG. 7 is a flowchart illustrating the latter part of the abnormal state detection routine performed when the concerning interruption is fount to be the third interruption or after (at step S505 of FIG. 6). In the case, the count value is read out of the decode counter 49 (at step S508) and stored overwriting (at step 509) at the area where the count value read out at the interruption two times before the preceding interruption is stored. Therefore, three count values are prepared, each corresponding to the concerned interruption, the preceding interruption and the interruption before the preceding interruption, respectively.

Then, the three count values are compared with each other (at step S510) for checking if the three count values are the same. When the three count values are found not the same (at step S511) that is, when at least one picture is decoded in three interruption intervals, an abnormal counter, which is provided also in an area of the RAM, is cleared into "0", and the CPU 41 waits for a following next interruption.

When the three count values are found the same, the abnormal counter is incremented (at step S513) and checked if the abnormal counter after the increment shows a threshold value or not (at step S514). In the example of FIG. 7, the threshold value is set to "10".

When the abnormal counter is showing a value smaller than "10", the abnormal detection routine ends without any further action, considering that no picture is decoded for some intervals but it is too early to decide that an abnormal state has occurred.

In case the abnormal counter reaches to "10", it is decided that an abnormal state has occurred in the multimedia communication terminal 22. The CPU 41 controls the video decoder 48 (at step S515) to output a background color to mask the displayed picture therewith, and controls the communication circuit 36 (at step S516) to send a message to the head end system 21, the upper system of the multimedia communication terminal 22, informing it of an abnormal state occurrence, which is transmitted in the control signals 37 to the head end system 21 by way of the control signal line 24, and the abnormal state detection routine ends, the software timer being stopped (at step S517) for suspending following interruptions. In the embodiment, the CPU 41 is checking if the abnormal counter after the increment shows a threshold value or not (at step S514), so the abnormal state is not checked doubly even if the software timer is left active. When the CPU 41 is programmed to check if the abnormal counter after the increment shows at least the threshold value or not at step S514, it is necessary to suspend the software timer.

In the embodiment concerning FIGS. 6 and 7, the decode counter 49 may be so prepared that it counts up pulses of the vertical synchronous signal to be used to synchronize the monitor 43 and it is reset at every timing when decoding of data of a picture frame is accomplished in the video decoder 48. In this case, the step 511 of FIG. 7 should be so modified that the abnormal counter is reset to "0" when the three count values are found to be the same, and is incremented otherwise at step S513, steps S514 to S516 following.

Heretofore, two embodiments of the invention are described.

The first embodiment described in connection with FIG. 2 is preferably applied for a multimedia communication terminal 22 wherein the interruption interval of the software timer is comparatively long, ten seconds for example. In such a multimedia communication terminal, 300 picture frames should be decoded in an interval of the interruption when 30 picture frames are scheduled to be decoded. So, when the count value of the decode counter 49 does not vary for a ten seconds' interruption interval, it can be surely decided that an abnormal state is occurred in the multimedia communication terminal 22.

On the other hand, the second embodiment described in connection with FIGS. 6 and 7 is preferably applied for a multimedia communication terminal 22 wherein the interruption interval of the software timer is comparatively short, a half second for example. There may occur some instantaneous interruptions in the transmission line 23. In such a case, that is, when the multimedia data 33 are supplied normally after the instantaneous interruption, it is inconvenient for the user as well as the service provider, if the display program is suspended by deciding the instantaneous interruption as an abnormal state. Therefore, in the second embodiment, the three count values of the decode counter 49 read out at each three successive interruptions of the software timer are compared, and further, only when the coincidence of the three count values occurs successively more than a threshold times, the multimedia communication terminal 22 is decided to be in an abnormal state. Therefore, even for the multimedia communication terminal 22 wherein the interruption interval of the software timer is comparatively short, the abnormal state detection can be performed with a sufficient reliability, by setting the threshold value appropriately.

Now, another embodiment of the invention to be applied especially for a multimedia communication terminal for reproducing the N-VOD service will be described.

As previously described, there may be a timing where no multimedia data is supplied for a subscriber when the subscriber turns on his multimedia communication terminal 22, in the N-VOD service, or there may be scheduled interruptions of the multimedia data supply when the multimedia communication terminal 22 is controlled to be tuned with the sub-channel supplying short programs in such an N-VOD service as proposed in the prior art.

Therefore, these scheduled interruptions, where data of no picture frame is decoded, should be discriminated from the abnormal reproduction because of the multimedia communication terminal 22.

For the purpose, a reproduction beginning detection routine and a reproduction ending detection routine are also provided in a third embodiment of the invention.

Figure 8:
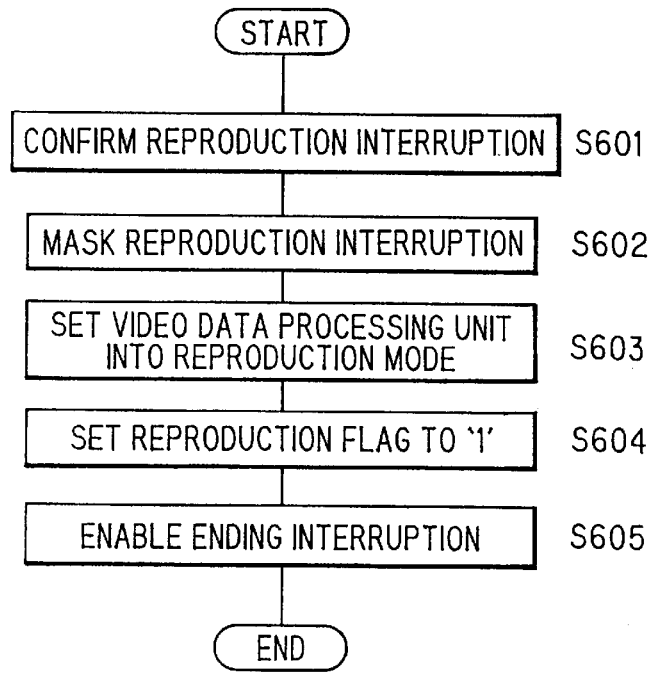
FIG. 8 is a flowchart illustrating the reproduction beginning detection routine performed in the CPU 41.
Figure 9:
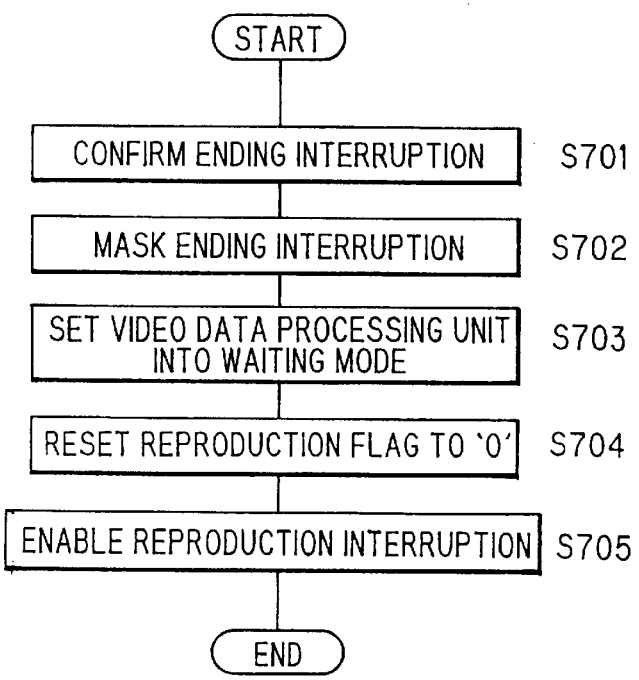
FIG. 9 is a flow chart illustrating the reproduction ending detection routine.

FIG. 8 is a flowchart illustrating the reproduction beginning detection routine performed in the CPU 41, while a flow chart of FIG. 9 illustrating the reproduction ending detection routine performed there.

In the embodiment, the reproduction beginning detection routine starts triggered with a reproduction interruption generated by the video decoder 48 and supplied to the CPU 41 by way of the bus lines 39 of FIG. 1, when data of a picture are decoded for the first time after the multimedia communication terminal 22 is activated.

When the reproduction interruption is confirmed (at step S601) and the beginning detection routine is started, the CPU 41 controls the video decoder 48 to mask, or inhibit from generating, the reproduction interruption (at step 602), setting the video data processing unit 42 into the reproduction mode (at step S603). Then, the CPU 41 sets a reproduction flag to '1' (at step S604) and enables (at step S605) the input signal processor 35 to generate an ending interruption when an end code is detected in the multimedia data 33.

When the input signal processor 35, enabled to generate the ending interruption, receives an end code indicating termination of a multimedia service, an ending interruption is generated, which is confirmed by the CPU 41 (at step S701) and the reproduction ending detection routine is started. Controlling the input signal processor 35 to mask the ending interruption (at step S702), the CPU 41 sets the video data processing unit 42 into a waiting mode (at step S703) and resets the reproduction flag to '0' (at step S704), and enables the video decoder 48 (at step S705) to generate the reproduction interruption, waiting for next reopen of the multimedia supply.

Thus, the reproduction status, that is whether video data should be decoded or not, of the multimedia communication terminal 22 can be confirmed in the embodiment whenever by referring to the reproduction flag.

Figure 10:
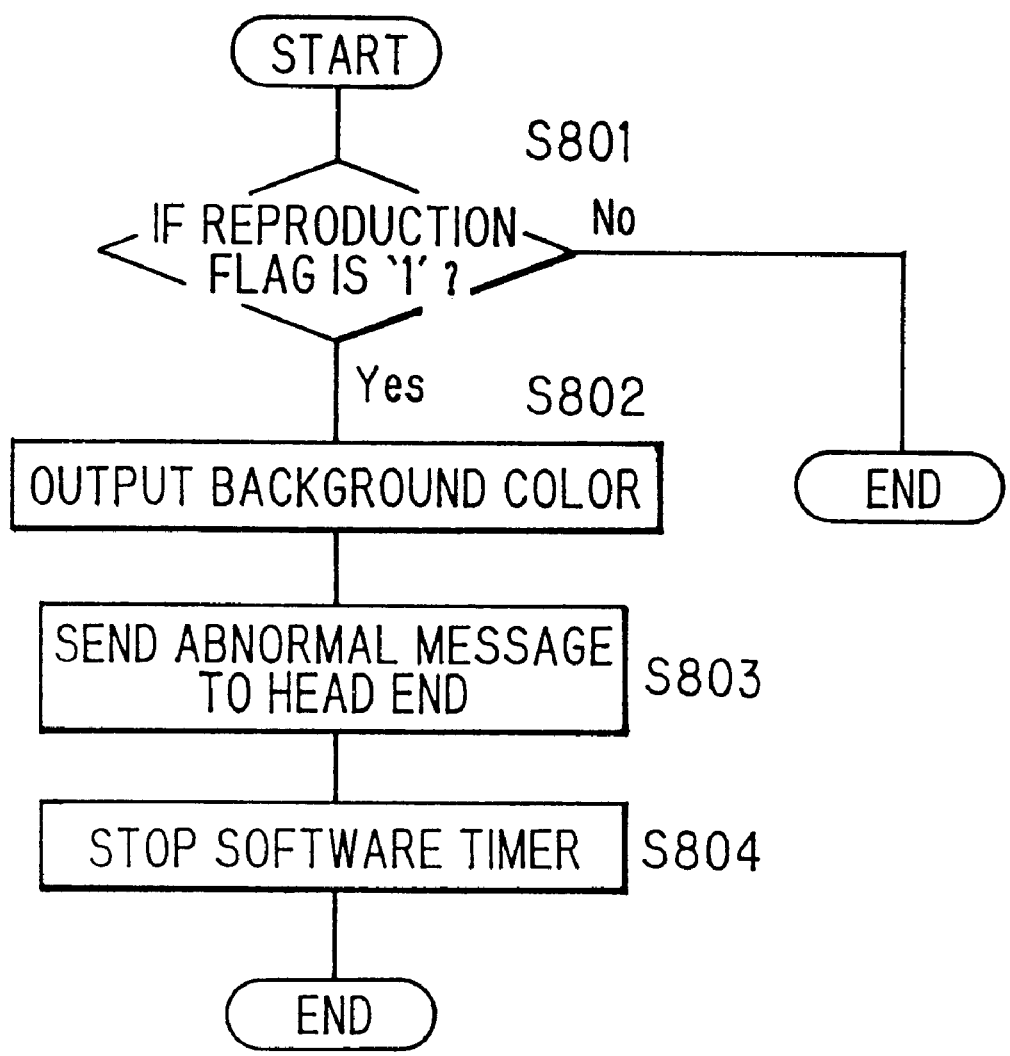
FIG. 10 is a flowchart of a part of the abnormal state detection routine performed in still another embodiment.

Making use of the reproduction flag, the scheduled interruption of the multimedia data supply can be discriminated as shown in FIG. 10.

FIG. 10 is a flowchart of a part of the abnormal state detection routine performed in the third embodiment, corresponding to steps S108 to S110 of FIG. 2 in the first embodiment and to steps S515 to S517 of FIG. 7 in the second embodiment.

When an abnormal possibility is detected at step S107 of FIG. 2 or at step S514 of FIG. 7, that is, when data of no picture frame is decoded for a period, the CPU 41 checks the reproduction flag (at step S801).

When the reproduction flag is not '1', the abnormal state detection routine of the third embodiment ends without any further action, otherwise, the CPU 41 controls the video decoder 48 (at step S802) to output a background color to mask the displayed picture therewith. Then, the CPU 41 controls the communication circuit 36 (at step S803) to send a message to the head end system 21, the upper system of the multimedia communication terminal 22, informing it of an abnormal state occurrence, stopping the software timer (at step S804).

In connection with FIG. 10, an application of the reproduction flag for discriminating the scheduled interruption of multimedia supply from the abnormal state in the multimedia communication terminal 22 is described.

However, the reproduction flag, namely, the reproduction status detection itself can be applied in various purposes. For example, it may be transmitted to the head end system 21 through the control signal line 24 to be referred to by an fare account system in the head end system 21, or an appropriate guidance to the user may be displayed on the monitor 43 when the reproduction flag is '0'.

What is claimed is:

1. A monitoring system of a multimedia communication terminal for reproducing multimedia data supplied through a transmission line from a head end system, said monitoring system comprising:

a decode counter, a count value of said decode counter being incremented each time when video data of a picture frame is decoded from multimedia data delivered through the transmission line by a video decoder provided in the multimedia communication terminal; and control means for detecting occurrence of an abnormal state in the multimedia communication terminal by checking said count value, and if successive ones of said count value are the same, for providing a signal indicating said abnormal state.

2. A monitoring system of a multimedia communication terminal for reproducing multimedia data supplied through a transmission line from a head end system, said monitoring system comprising:

a decode counter, a count value of said decode counter being incremented each time when video data of a picture frame is decoded from multimedia data delivered through the transmission line by a video decoder provided in the multimedia communication terminal; and control means for detecting occurrence of an abnormal state in the multimedia communication terminal by checking said count value, and if successive ones of said count value are the same, for providing a signal indicating said abnormal state, and further comprising a communication circuit, said communication circuit being controlled by said control means to send an abnormal message to the head end system requesting suspension of delivery of the multimedia data to the multimedia communication terminal when said abnormal state is detected.

3. A monitoring system of a multimedia communication terminal for reproducing multimedia data supplied through a transmission line from a head end system, said monitoring system comprising:

a decode counter, a count value of said decode counter being incremented each time when video data of a picture frame is decoded from multimedia data delivered through the transmission line by a video decoder provided in the multimedia communication terminal; and control means for detecting occurrence of an abnormal state in the multimedia communication terminal by checking said count value, and if successive ones of said count value are the same, for providing a signal indicating said abnormal state, and further comprising:

a video data processing unit, said video data processing unit being controlled by said control means to generate display data for informing a user of said abnormal state when said abnormal state is detected; and a communication circuit, said communication circuit being controlled by said control means to send an abnormal message to the head end system requesting suspension of delivery of the multimedia data to the multimedia communication terminal when said abnormal state is detected, and to send a reopening request to the head end system requesting reopening of delivery of the multimedia data to the multimedia communication terminal when said abnormal state is confirmed to be eliminated.

4. The monitoring system of a multimedia communication terminal recited in claim 1, wherein said control means reads out said count value periodically with a certain interval, and decides that an abnormal state has occurred in the multimedia communication terminal when said count value does not vary during said certain interval.

5. The monitoring system of a multimedia communication terminal recited in claim 1, wherein said control means reads out said count value periodically with a certain interval, and decides that an abnormal state has occurred in the multimedia communication terminal when said count value does not vary for three or more of said certain intervals.

6. A monitoring system of a multimedia communication terminal for reproducing multimedia data supplied through a transmission line from a head end system, said monitoring system comprising:

a decode counter, a count value of said decode counter being incremented each time when video data of a picture frame is decoded from multimedia data delivered through the transmission line by a video decoder provided in the multimedia communication terminal; and control means for discriminating whether the multimedia data are supplied or not by detecting beginning and end of reproduction of the multimedia data, and detecting occurrence of an abnormal state in the multimedia communication terminal by checking said count value and if successive ones of said count value are the same, for providing a signal indicating said abnormal state.

7. The monitoring system of a multimedia communication terminal recited in claim 6 further comprising a communication circuit, said communication circuit being controlled by said control means to send an abnormal message informing the head end system of said abnormal state when the multimedia data is supplied and said abnormal state is detected.

8. The monitoring system of a multimedia communication terminal recited in claim 6, further comprising a video data processing unit, said video data processing unit being controlled by said control means to generate display data for informing a user of said abnormal state when the multimedia data is supplied and said abnormal state is detected.

9. The monitoring system of a multimedia communication terminal recited in claim 6, wherein said control means detects said beginning of reproduction of the multimedia data by a software interruption generated when data of a picture are first decoded from the multimedia data of a program, and detects said ending of reproduction of the multimedia data by another software interruption generated when an end code is found in the multimedia data.

* * * * *